(12) United States Patent
Gartner et al.

(10) Patent No.: US 8,355,489 B2
(45) Date of Patent: Jan. 15, 2013

(54) TELECONFERENCE SCHEDULING AND ACTIVITY REPORTING METHOD

(75) Inventors: Jeffrey G. Gartner, Hopewell Junction, NY (US); Ramanujan Kashi, Magarpatta (IN); Colm Smyth, Foxrock (IE)

(73) Assignee: Avaya Inc., Basking Ridge, NJ (US)

( * ) Notice: Subject to any disclaimer, the term of this patent is extended or adjusted under 35 U.S.C. 154(b) by 590 days.

(21) Appl. No.: 12/612,183

(22) Filed: Nov. 4, 2009

(65) Prior Publication Data

US 2011/0103568 A1 May 5, 2011

(51) Int. Cl.
*H04M 3/42* (2006.01)
*G06F 15/16* (2006.01)

(52) U.S. Cl. ......... 379/202.01; 379/203.01; 379/204.01; 455/416; 709/204

(58) Field of Classification Search ............. 379/202.01, 379/88.19, 201.01, 203.01, 204.01, 205.01; 709/204; 455/416
See application file for complete search history.

(56) References Cited

U.S. PATENT DOCUMENTS

| | | | |
|---|---|---|---|
| 6,101,480 A | 8/2000 | Conmy et al. | |
| 2002/0131565 A1* | 9/2002 | Scheuring et al. | 379/88.19 |
| 2004/0199580 A1* | 10/2004 | Zhakov et al. | 709/204 |
| 2005/0018826 A1* | 1/2005 | Benco et al. | 379/202.01 |

* cited by examiner

*Primary Examiner* — Thjuan K Addy (57) ABSTRACT

A teleconference system that monitors the activity levels of one or more attendees of a teleconference and, based on that monitoring, provides information about attendees who are active participants and attendees who are passive listeners. The information includes evaluative feedback or a conference roster that is ordered based on the activity levels of the attendees, or both. Furthermore, the teleconference system takes into account that the potential invitees to a teleconference being scheduled can be different from one another in terms of their importance to a teleconference being scheduled, or in terms of the relevance of the teleconference to those invitees. The system is also able to consider the activity levels that are reported for a teleconference in progress when the system schedules a new teleconference.

20 Claims, 5 Drawing Sheets

TELECONFERENCE SCHEDULING AND ACTIVITY REPORTING METHOD

FIELD OF THE INVENTION

The present invention relates to telecommunications in general, and, more particularly, to teleconferencing.

BACKGROUND OF THE INVENTION

A teleconference is a meeting between two or more participants who are not at the same place at the same time. Teleconferencing is a low-cost alternative to getting large groups of invitees in a single place at the same time for the purpose of having a meeting. The best known example of a teleconference is a conference call with more than two people participating in the call. These teleconferences can have upwards of several hundred people and can last for several hours. An alternative to having a teleconference would be to get these people to the same place at the same time, which is often prohibitive.

Some teleconferencing systems in the prior art have a method of displaying a roster of conference attendees or of playing back a roll call of those attendees. In at least some of those prior-art systems, however, the roster does not differentiate between attendees who are active participants and attendees who are passive listeners. Furthermore, some teleconferencing systems in the prior art have a method of scheduling new teleconferences based on the schedules of potential invitees; however, at least some of those systems do not take into account that the potential invitees can be different from one another in terms of their importance to a teleconference being scheduled.

Therefore, what is needed is an improved teleconference system, in particular that accounts for both the behavior and characteristics of attendees of teleconferences that have already taken place as well as teleconferences that are currently in progress, without some of the disadvantages in the prior art.

SUMMARY OF THE INVENTION

The present invention provides for an improved teleconference system without the disadvantages that are present in some systems of the prior art. In accordance with the illustrative embodiment of the present invention, the disclosed teleconference system monitors the activity levels of one or more attendees of a teleconference and, based on that monitoring, provides information about attendees who are active participants and attendees who are passive listeners. The information includes evaluative feedback or a conference roster that is ordered based on the activity levels of the attendees, or both. Furthermore, the system of the illustrative embodiment takes into account that the potential invitees to a teleconference that is being scheduled can be different from one another in terms of their importance to a teleconference being scheduled, or in terms of the relevance of the teleconference to those invitees. The system is also able to consider the activity levels monitored for a teleconference in progress when it schedules a new teleconference to take place at a future time.

In accordance with the illustrative embodiment, the teleconference system initiates a teleconference that involves a set of attendees and also transmits an initial conference roster that lists the attendees. During the teleconference, the system refines the list by receiving indications about the activity levels of the attendees and then reordering the list based on the indications received. For example, one indicator of the activity level of an attendee is whether the mute status of the microphone at the attendee's endpoint is "unmuted" or "muted." The system then transmits one or more updated conference rosters, which can be reordered from one roster to the next based on the relative activity levels of the attendees changing. The system may also transmit the activity levels of one or more attendees to one or more endpoints.

Further in accordance with the illustrative embodiment, the teleconference system also schedules a new teleconference by not only considering the availabilities of the potential invitees, but also one or more predetermined characteristics of those invitees. Such characteristics may include, but are not limited to, i) the importance of an invitee to a teleconference being scheduled and ii) the relevance of the topics to be discussed at the teleconference to an invitee being considered for that teleconference. Each characteristic of each invitee is represented by a weight value, which the system accounts for in the manner disclosed in this specification. In some embodiments, the system permits the iterative adjustment of the weight values by sharing the most recently-solicited weight values with the invitees, followed by receiving and considering updated weight values from those invitees, or other sources. For example, each of two invitees might think that he is indispensable to the teleconference being scheduled; however, their supervisor might decide that having one of those invitees present is sufficient, and as a result provides an updated weight value for each of the two invitees that reflects the supervisor's decision.

Advantageously, the monitoring and reporting of the activity levels is useful for purposes of providing evaluative feedback to one or more individuals. It can be used for a variety of applications, including:
  i. bringing into the discussion, in order to get their input, those individuals who tend to be quiet,
  ii. evaluating the interest level of the attendees, and
  iii. determining whether new teleconferences of related subject matter could be more efficiently scheduled without as many attendees.

With regard to new teleconferences, the activity level of each attendee on a previous teleconference can be considered in situations where those attendees are being considered as invitees to a new teleconference. Even without considering past activity levels when scheduling new teleconferences, the system of the illustrative embodiment is able to optimize the start time of a teleconference by allowing for invitees to be considered differently, depending on their relative importance or other characteristics.

The illustrative embodiment of the present invention comprises: initiating, at a teleconference bridge, a first teleconference with telecommunications endpoints of a first plurality of attendees; receiving, at the teleconference bridge, an indication from a telecommunications endpoint of a first attendee in the first plurality as to whether a microphone of the telecommunications endpoint of the first attendee is muted; transmitting a list, to the telecommunications endpoint of at least one of the attendees, the list comprising indicia of the attendees, and the indicia being ordered in the list in accordance with an ordering that is based on the indication received; receiving, from one invitee in a second plurality of invitees to a second teleconference and ii) a first weight value that represents a predetermined characteristic of the first invitee, wherein the first invitee is also one of the attendees of the first teleconference; and transmitting a notice of the second teleconference to at least the first invitee, the notice comprising a start time that is based on the first weight value.

DETAILED DESCRIPTION

Figure 1:
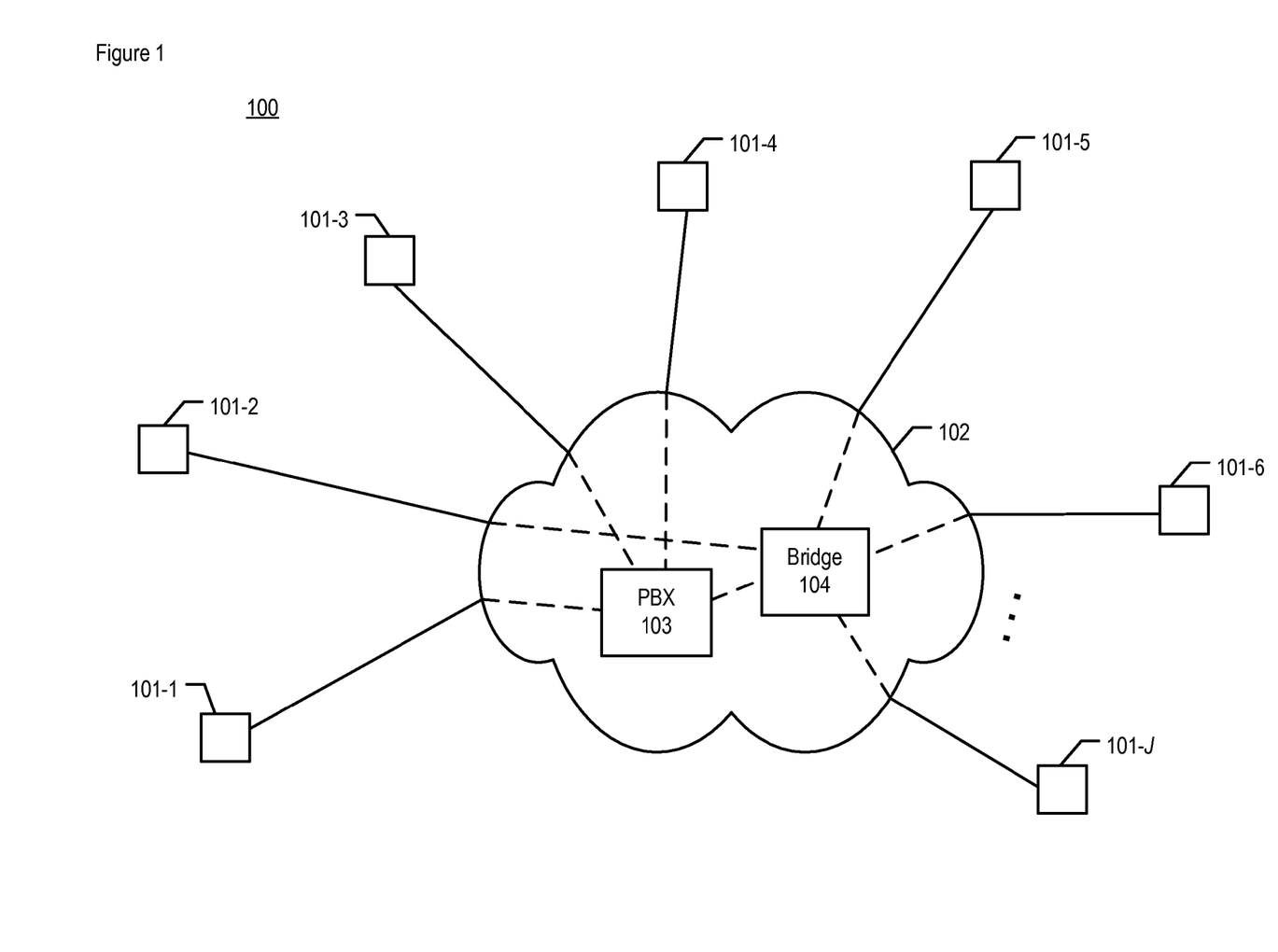
FIG. 1 depicts a schematic diagram of teleconference system 100 in accordance with the illustrative embodiment of the present invention.

FIG. 1 depicts a schematic diagram of teleconference system 100 in accordance with the illustrative embodiment of the present invention. System 100 comprises telecommunications endpoints 101-1 through 101-J, wherein J is an integer greater than one; telecommunications network 102; private branch exchange (PBX) 103; and teleconference bridge 104, interconnected as shown.

Telecommunications endpoint 101-j, where j has a value between 1 and J, inclusive, is a device that is capable of handling for its user a telephone call or other type of communication session, or both. Endpoint 101-j can be a cellular phone, a conference phone (i.e., "speakerphone"), a deskset, a computer with or without a resident softphone, or some other type of telecommunications appliance that is capable of exchanging voice signals and/or other communication signals. Endpoint 101-j is able to contact, or to be contacted by, another endpoint or device within teleconference system 100. For example, in order to participate in a conference call (i.e., one example of a "teleconference"), endpoint 101-j is able to specify a telephone number or other type of contact address that routes to teleconference bridge 104.

Some of endpoints 101-1 through 101-J are endpoints that are tied to a private-branch exchange (PBX), such as desksets in an office enterprise network for which telecommunications service is enabled by private-branch exchange 103, or another type of telecommunications exchange, switch, or server. For example, endpoints 101-1, 101-3, and 101-4 as depicted are desksets in an office enterprise network for which telecommunications service is enabled by PBX 103 in order to place or receive a call, such as a conference call that involves bridge 104. In any event, it will be clear to those skilled in the art how to make and use telecommunications endpoint 101-j.

In some embodiments, servers not depicted in FIG. 1 may be present in order to support various types of communication. An Instant-Messaging (IM) server may be used to enable the users of one or more of the endpoints to communicate with each other through instant messaging. An email server may be used to enable the users of one or more of the endpoints to communicate with each other through email messages. A voicemail server may be used to enable the endpoint users to leave voicemail messages for other users, in which the messages are retrievable from endpoints. A file server may be used to enable the users of one or more of the endpoints to both save and retrieve electronic documents such as presentation slides and text documents. As those who are skilled in the art will appreciate, various complements of telecommunications servers may exist within telecommunications system 100.

Telecommunications network 102 provides the connectivity among endpoints 101-1 through 101-J, and enables the transport and control of communications signals between two or more endpoints per session. For clarity purposes, only a subset of the connectivity is depicted, as dashed lines; however, network 102 also enables the transport of communications signals between the endpoints and the telecommunications exchanges, switches, and servers in system 100. The communications signals convey different types of media such as audio, video, imaging, text, and so forth. To this end, network 102 comprises one or more interconnected data-processing systems such as switches, servers, routers, and gateways, as are well-known in the art.

In accordance with the illustrative embodiment, network 102 comprises an Internet Protocol-based (IP-based) network, as is known in art, for the purpose of transporting voice signals. Although network 102 in the illustrative embodiment comprises a Voice-over-IP (VoIP) service provider's network, network 102 could alternatively or additionally comprise another type of network such as the Internet, some other type of IP-based network, or some other type of packet-based network, such as the Public Switched Telephone Network, as those who are skilled in the art will appreciate.

Teleconference bridge 104 is a data-processing system, such as a server or switch, which enables the users of multiple endpoints to communicate with each other during a conference call, for one or more concurrent calls. Bridge 104 receives audio signals from endpoints that are participating on a conference call, mixes those signals together, and transmits the mixed signals back to the endpoints.

Bridge 104 also performs at least some of the tasks of the illustrative embodiment, which are described below and with respect to FIGS. 2 through 5. It will be clear, however, to those skilled in the art how to make and use alternative embodiments of the present invention in which a data-processing system different than bridge 104 performs some or all of the tasks of the illustrative embodiment. For example, in some alternative embodiments, private-branch exchange 103 might perform some or all of the tasks described herein, and in some other alternative embodiments, a different data-processing system not shown might perform the tasks.

Furthermore, it will be clear to those skilled in the art, after reading this specification, how to make and use embodiments of system 100 in which the activity reporting of the illustrative embodiment is performed for multiple teleconferences. It will also be clear to those skilled in the art, after reading this specification, how to make and use embodiments in which the teleconference scheduling of the illustrative embodiment is performed for multiple teleconferences, in which the activity reported from one or more teleconferences is considered for each teleconference being scheduled.

FIGS. 2 through 5 depict flowcharts of salient tasks that are related to the performing of teleconference processing, by teleconference bridge 104, in accordance with the illustrative embodiment of the present invention. As those who are skilled in the art will appreciate, some of the tasks that appear in the flowcharts can be performed in parallel or in a different order than that depicted. Moreover, those who are skilled in the art will further appreciate that in some alternative embodiments of the present invention, only a subset of the depicted tasks are performed.

Figure 2:
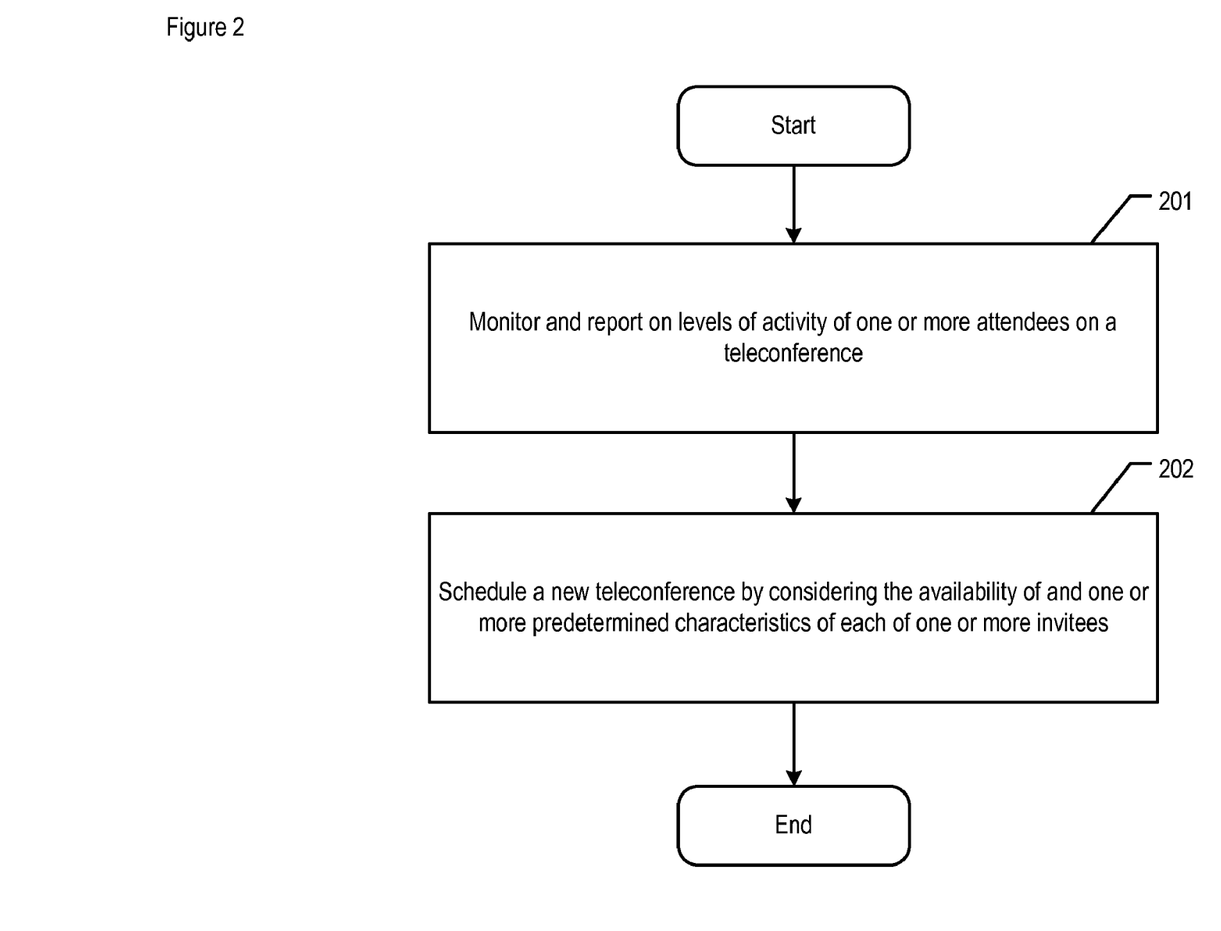
FIG. 2 depicts an overview of the teleconference processing performed by teleconference bridge 104 of system 100.

FIG. 2 depicts an overview of the teleconference processing performed by teleconference bridge 104. At task 201, bridge 104 monitors and reports on the levels of activity of one or more attendees on a teleconference in progress. The salient subtasks of task 201 are described in detail below and with respect to FIG. 3.

At task 202, bridge 104 schedules a new teleconference by considering the availability of and one or more predetermined characteristics of each of the potential invitees to the teleconference. The salient subtasks of task 202 are described in detail below and with respect to FIG. 4.

As those who are skilled in the art will appreciate after reading this specification, in some embodiments bridge 104 repeats the tasks depicted in FIG. 2. The bridge does so by i) proceeding back to task 201, in order to initiate and monitor a second teleconference such as a teleconference that was scheduled at the previous execution of task 202, and then ii) proceeding to task 202, in order to schedule a third teleconference in accordance with the illustrative embodiment, and so forth.

Figure 3:
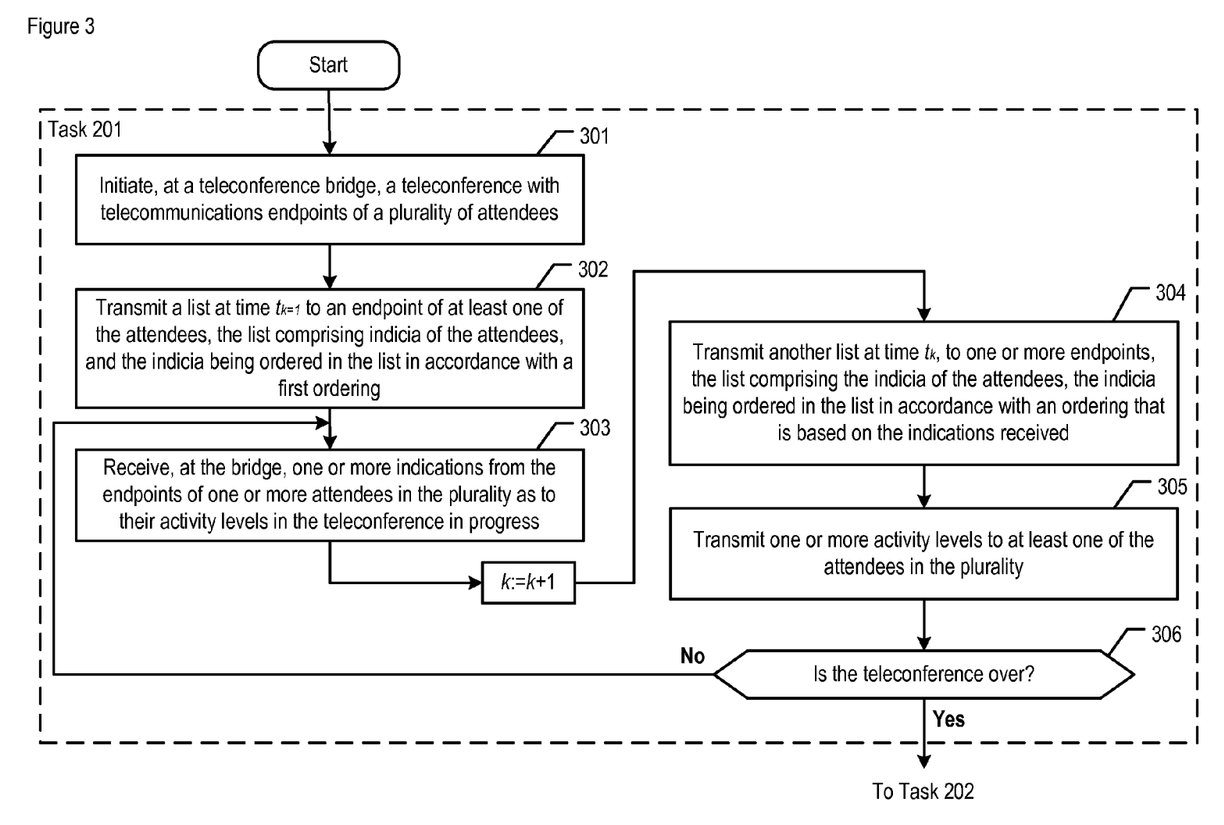
FIG. 3 depicts the tasks that are associated with monitoring and reporting on the levels of activity of one or more attendees on a teleconference, as part of the illustrative embodiment.

FIG. 3 depicts the tasks that are associated with monitoring and reporting on the levels of activity of one or more attendees on a teleconference. At task 301, teleconference bridge 104 initiates a teleconference with one or more of telecommunications endpoints 101-1 through 101-J in well-known fashion.

At task 302, bridge 104 transmits a list at time $t_k$, in which k is equal to 1, to one or more endpoints of the attendees. The list comprises indicia of the attendees, such as one or more of each attendee's name, employee identification number, organization, job title in the organization, mailing address, contact number, and so forth. Bridge 104 orders the indicia so that they are ordered in the list in accordance with a first ordering. The first ordering can be based on one or more criteria, as those who are skilled in the art will appreciate, such as alphabetical order of attendee name, chronological order of when each attendee is scheduled to make a presentation, random order, and so forth. The transmission of the list can occur either before or after the teleconference is initiated, as those who are skilled in the art will appreciate.

At task 303, bridge 104 receives one or more indications from the endpoints of one or more attendees as to their activity levels in the teleconference. One example of activity level is the participation level in the teleconference of an attendee, in terms of how often an attendee speaks or is preparing to speak. In accordance with the illustrative embodiment, bridge 104 detects when the muting button at an attendee's endpoint is actuated for muting the microphone and for unmuting the microphone. From these detections, the bridge can determine how often muting and/or unmuting occurs, what percentage of time muting and/or unmuting occurs, and so forth. In some embodiments, the bridge calculates the fraction of time that each attendee has spoken thus far in the teleconference, for one or more of the attendees, either through voice activity detection or by inferring speech intervals by tracking the muting and unmuting. From these received and/or derived indications, bridge 104 is able to establish an activity level for each attendee being monitored. As those who are skilled in the art will appreciate, other signals can be used in order to derive an attendee's level of activity on a teleconference.

Counter k is then incremented, and at task 304 bridge 104 transmits a list at new time $t_k$, which is subsequent to the previous transmit time $t_{k-1}$, to one or more endpoints of the attendees. The list comprises indicia of the attendees, such as those examples provided above and with respect to the description of task 302. Bridge 104 arranges the indicia so that they are ordered in accordance with an ordering that is based on the indications related to activity level and received at task 303. In accordance with the illustrative embodiment, the ordering that is applied to the list at task 304 is based on placing the most active participants toward the beginning of the list. As those who are skilled in the art will appreciate, however, bridge 104 in some alternative embodiments can use different criteria for ordering the indicia.

At task 305, in some embodiments, bridge 104 also transmits indicators of one or more activity levels to at least one of the attendees in the plurality. An attendee may use these indicators as evaluative feedback, in order to assess how much he or she has been participating in the teleconference, or how much another attendee has been participating. In some embodiments, bridge 104 adjusts the indicator before transmitting it, in order to account for a predetermined attribute such as the relevance of the teleconference to the attendee being monitored, thereby accounting for an attendee who does not participate mainly because the teleconference is not relevant to him or her.

At task 306, bridge 104 determines if the teleconference is over. If not, task execution proceeds back to task 303, in order to process additional activity-related indications and update the activity levels reported. Otherwise, the teleconference is over and task execution proceeds to task 202.

Figure 4:
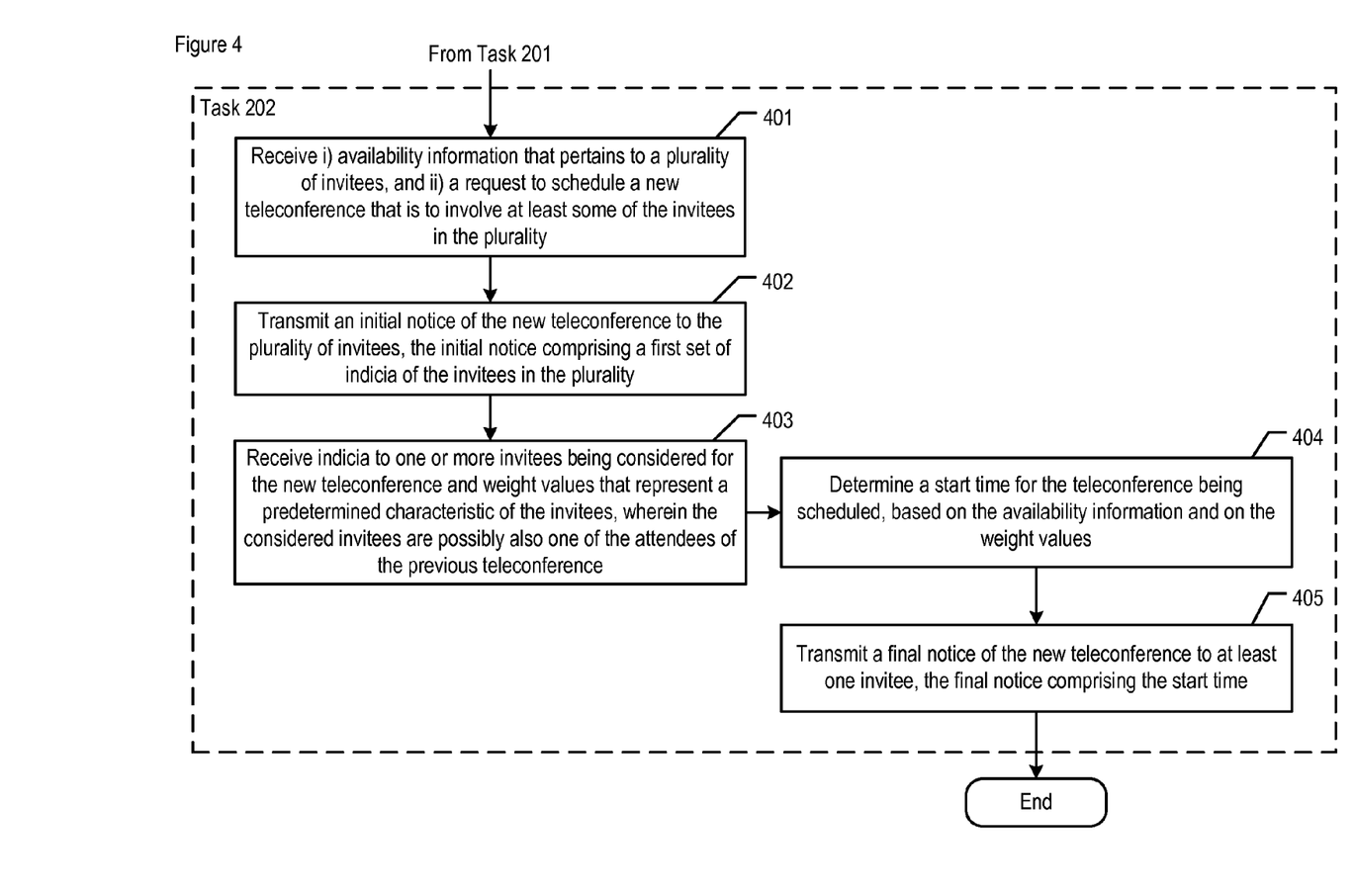
FIG. 4 depicts the tasks that are associated with scheduling another teleconference, as part of the illustrative embodiment.

FIG. 4 depicts the tasks that are associated with scheduling another teleconference. At task 401, teleconference bridge 104 receives availability information of potential invitees to a teleconference, which information indicates when each potential invitee is or is not available for a meeting. The bridge acquires the availability information for each potential invitee from a scheduler application or from another source, in well-known fashion. In some embodiments, the availability information comprises the calendrical times of when each potential invitee is available or is not available, or both.

Bridge 104 also receives a request to schedule the teleconference, which is to involve at least some of the potential invitees for which availability information is being received. The teleconference scheduling request can be received either along with or separate from the availability information.

At task 402, bridge 104 transmits to the potential invitees an initial notice of the teleconference being scheduled. The initial notice comprises a first set of indicia of the potential invitees. The indicia can be such as those examples provided above and with respect to the description of task 302.

At task 403, bridge 104 receives, from at least one invitee among the potential invitees, i) an indicium to each invitee who is being considered for the teleconference being scheduled, for one or more invitees being considered, and ii) one or more weight values for the invitees who are being considered. The weight value or values for each invitee being considered represent one or more predetermined characteristics of the invitee. The predetermined characteristics can include, but are not limited to, i) the importance of the invitee being considered to the teleconference being scheduled, and ii) the relevance of the teleconference being scheduled to the invitee being considered. It will be clear to those skilled in the art how to use other predetermined characteristics and how to represent the weight values themselves. For example, the weights can be represented on a numerical scale having a predetermined range (e.g., 1 to 10, 1 to 1000, etc.), in which a greater value corresponds to a greater importance of the invitee to the teleconference. Alternatively, a greater value can correspond to lesser importance.

In some embodiments, one or more of the invitees being considered were also attendees of the teleconference conducted at task 201. The weight or weights received can be sent either from the invitees to which the weights apply or from another source. For example, some or all of the weights can be provided by the teleconference host, one of invitees being considered for the teleconference, a person who is not being considered for the teleconference, or even a data-processing system in which predetermined weights are stored for each potential invitee and for each type of teleconference that is known ahead of time within an organization.

At task 404, bridge 104 determines the start time of the teleconference being scheduled. The salient subtasks of task 404 are described below and with respect to FIG. 5.

In some embodiments, bridge 104 repeats tasks 402 through 404, in order to refine the start time that it determines at task 404. For example, bridge 104 may i) transmit at least one additional, intermediate notice, thereby giving the invitees another opportunity to provide input on who should be invited to the teleconference and what their weight values should be; ii) receive updated indicia and/or weight values from one or more invitees, thereby receiving their updated input; and iii) process the updated input, thereby revising the start time. It will be clear to those skilled in the art, after reading this specification, how to iterate any number of times through the tasks of the illustrative embodiment, in order to optimize the start time.

At task 405, bridge 104 transmits a final notice of the scheduled teleconference to at least one of the invitees considered for the teleconference. The final notice comprises the start time for the teleconference determined at task 404.

Figure 5:
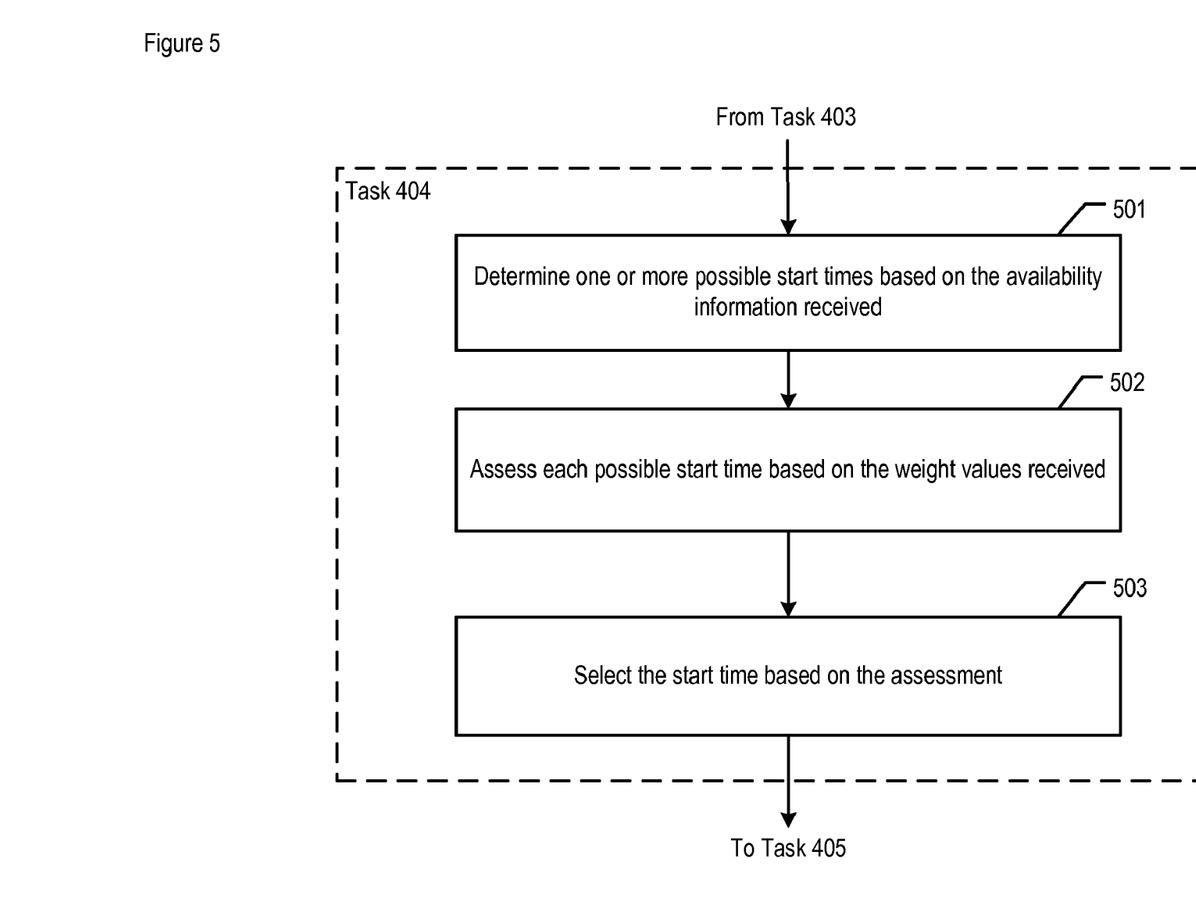
FIG. 5 depicts the tasks that are associated with determining the start time of the teleconference being scheduled, as part of the illustrative embodiment.

FIG. 5 depicts the tasks that are associated with determining the start time of the teleconference being scheduled. At task 501, bridge 104 determines one or more possible start times for the teleconference, based on the availability information received at task 401 from a scheduler application in well-known fashion. This can be accomplished, for example, by determining the overlap of the "free" time of each invitee being considered, in terms of how that free time coincides across the schedules of the different invitees. It will be clear to those skilled in the art how to determine one or more start times based solely on the availabilities of each invitee being considered.

At task 502, bridge 104 assesses each possible start time based on the weight values received at task 403, in accordance with the illustrative embodiment, while taking into account each subset of invitees that were, in fact, available at each potential start time that was determined at task 501.

For pedagogical purposes, assume that each weight value relates to the relative importance of each invitee to the teleconference, and that a greater value corresponds to lesser importance of the invitee. For each potential start time determined, bridge 104 adds the weight values together of all of the invitees that were available at the start time currently being considered. The sum of the weight values is indicative of the composite importance of the available invitees for that start time, in which the greater the value of the sum, the lesser the composite importance of the subset of invitees available at that start time. Conversely, the lesser the value of the sum, the greater the composite importance. Bridge 104 stores the sum corresponding to each potential start time considered.

At task 503, bridge 104 selects a start time from the stored potential start times. For pedagogical purposes, the bridge selects the start time that corresponds to the lowest-valued sum, which as described at task 502 corresponds to the greatest-valued composite importance.

In some embodiments, the start time is also based on maximizing the number of invitees who are available to attend the teleconference being scheduled, either at some point (e.g., at the start time, etc.) in the teleconference or in its entirety. Following the convention of lowest-valued sum representing greatest importance, bridge 104 may not necessary select the lowest-valued sum, but may instead select the lowest-valued sum that corresponds to a predetermined minimum number of invitees being available.

Alternatively, the start time can be based on including at least one invitee with the most-significant weight value out of all of the invitees considered. The start time can also be based on the level of activity in a previous teleconference of at least one of the invitees being considered. In other words, following the convention of lowest-valued sum representing greatest importance, bridge 104 may select the lowest-valued sum that corresponds to the most important invitee being available or the most active attendee in a previous teleconference, or both. As those who are skilled in the art will appreciate, bridge 104 may consider other characteristics in addition to the weight values of the invitees when determining the start time.

In some alternative embodiments, bridge 104 might select multiple start times and transmit those start times to one or more invitees, in order to permit the invitees to select from among more than one possibility.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
receiving, via a processor, availability information associated with a plurality of invitees, and a request to schedule a teleconference comprising at least some of the plurality of invitees;
transmitting, in response to the request, a first notice of the teleconference to the plurality of invitees, the first notice comprising a set of indicia of the at least some of the the plurality of invitees;
receiving, from a first invitee in the plurality of invitees and in response to the first notice, an indicium of a second invitee, the indicium being a member of the set of indicia, and a weight value that represents a predetermined characteristic of the second invitee; and
transmitting a second notice of the teleconference to at least the second invitee, the second notice comprising a start time that is based on the availability information and the weight value.

2. The method of claim 1, wherein the availability information comprises calendrical times of when the second invitee is available.

3. The method of claim 1, wherein the second invitee is the first invitee.

4. The method of claim 1, wherein the second invitee is someone other than the first invitee.

5. The method of claim 1, wherein the predetermined characteristic is an importance of the second invitee to the teleconference.

6. The method of claim 1, wherein the predetermined characteristic is a relevance of the teleconference to the second invitee.

7. The method of claim 1, further comprising:
transmitting, in response to receiving the weight value, an intermediate notice of the teleconference to the plurality of invitees, the intermediate notice comprising a subset of indicia of the set of indicia;
receiving, in response to the intermediate notice, the indicium and a second weight value that represents the predetermined characteristic of the second invitee, wherein the start time is also based on the second weight value.

8. The method of claim 1, wherein the start time is also based on maximizing a number of invitees available to attend the teleconference at the start time.

9. The method of claim 1, wherein the start time is also based on including at least one invitee with a greatest weight value out of the plurality of invitees.

10. The method of claim 1, wherein the start time is also based on an activity level of the second invitee in relation to another teleconference that began before the start time.

11. A method comprising:
- initiating, at a teleconference bridge, a teleconference with telecommunications endpoints associated with a plurality of attendees;
- transmitting, at a first time, a first list to a first telecommunications endpoint associated with at least one of the plurality of attendees, the first list comprising indicia of the plurality of attendees, the indicia being ordered in the first list in accordance with a first ordering;
- receiving, at the teleconference bridge, an indication from a second telecommunications endpoint associated with an attendee from the plurality of attendees, the indication comprising an activity level of the attendee in relation to the first teleconference and a weight value that represents a predetermined characteristic of the attendee; and
- transmitting, at a second time later than the first time, a second list to the second telecommunications endpoint associated with the attendee, the second list comprising the indicia of the plurality of attendees, the indicia being ordered in the second list in accordance with a second ordering, and the second ordering being based on the indication received.

12. The method of claim 11, wherein the indication conveys a mute status of a microphone at the second telecommunications endpoint associated with the attendee.

13. The method of claim 11, wherein the activity level comprises a first activity level, the method further comprising transmitting a second activity level of the attendee to the first telecommunications endpoint associated with the at least one of the plurality of attendees, wherein the second activity level is determined based on the indication.

14. The method of claim 13, wherein the at least one of the plurality of attendees comprises the attendee.

15. The method of claim 13, wherein the at least one of the plurality of attendees comprises someone other than the attendee.

16. The method of claim 13, wherein the activity level is determined also based on relevance of the first teleconference to the attendee.

17. The method of claim 13, wherein the teleconference comprises a first teleconference, the method further comprising transmitting a notice of a second teleconference to the second telecommunications endpoint associated with the attendee, wherein the notice comprises a start time that is based on the activity level of the attendee in the first teleconference.

18. A method comprising:
- initiating, at a teleconference bridge, a first teleconference with telecommunications endpoints of a plurality of attendees;
- receiving, at the teleconference bridge, an indication from a first telecommunications endpoint associated with an attendee from the plurality of attendees as to whether a microphone of the first telecommunications endpoint is muted;
- transmitting a list, to a second telecommunications endpoint associated with at least one of the plurality of attendees, the list comprising indicia of the plurality of attendees, and the indicia being ordered in the list in accordance with an ordering that is based on the indication;
- receiving, from an invitee in a plurality of invitees to a second teleconference, an indicium to the invitee and a weight value that represents a predetermined characteristic of the invitee, wherein the invitee is also one of the plurality of attendees of the first teleconference; and
- transmitting a notice of the second teleconference to the invitee, the notice comprising a start time that is based on the weight value.

19. The method of claim 18, further comprising transmitting an activity level of the attendee to the second telecommunications endpoint associated with the at least one of the plurality of attendees, wherein the activity level is determined based on the indication.

20. The method of claim 19, wherein the start time is also based on the activity level of the attendee in the first teleconference.

* * * * *